106. COMPOSITIONS, COATING OR PLASTIC.

84

UNITED STATES PATENT OFFICE.

CHARLES F. LAWTON, OF BROOKLYN, NEW YORK.

CEMENT.

SPECIFICATION forming part of Letters Patent No. 594,113, dated November 23, 1897.

Application filed December 7, 1895. Serial No. 571,411. (No specimens.)

*To all whom it may concern:*

Be it known that I, CHARLES FRANCIS LAWTON, a citizen of the United States of America, residing at Brooklyn, county of Kings, and State of New York, have invented and made a certain new and useful Cement; and I do hereby declare that the following is a full, clear, and exact description and specification of the same.

My invention relates to cements for cementing one article to another by means of the use of sodium tetrasilicate as a basis for adding other valuable ingredients for the purpose of making a material which is capable of being and is primarily plastic in its nature and afterward by the addition of other ingredients becomes hard, adhesive, and anhydrous and incapable of absorbing water or gases, which with most other cements render such materials liable to deteriorate by time. I also accomplish the perfection of my cement, to make it permanently anhydrous and hard, by the use of a very moderate degree of heat, not above 300°, and it is subjected to this low temperature for a period of not over five or six hours.

I am aware that silicate of soda has heretofore been used as a basis for cement more or less hard and anhydrous in various ways. I have heretofore patented such cements myself. Therefore I do not claim, broadly, such a cement, but my present invention is confined to substantially the chemical constituents hereinafter set forth in this specification, which are all specifically claimed at the end of this schedule.

In order that persons skilled in the art to which my invention appertains may understand clearly how to compound and use my invention, I will proceed to describe it as follows:

To begin with, I prepare a sodium tetrasilicate ($Na_2Si_4O_9$) by fusing together one hundred and eighty parts of white sand or powdered quartz, one hundred of calcined soda-ash, and three parts of charcoal, all in powder and intimately mixed. After cooling the hard mass so produced is reduced to fine powder and boiled in water, which dissolves it to a transparent syrupy fluid containing such a proportion of water to the solid matter in solution, if the right quantity of water and tetrasilicate is used, that the latter will form from fifteen to twenty per cent. of the whole solution. Then to three gallons of the above solution containing, say, seventeen per cent. of sodium tetrasilicate I add three pounds of finely-powdered calcium carbonate, twelve pounds of very finely-ground quartz, and three pounds of a finely-ground compound made by fusing in a crucible or on the hearth of a reverberatory furnace an intimate mixture of sixty parts quartz-sand, twenty-eight parts lime, thirty-four parts alumina, and five parts calcined carbonate of soda. If silicate of alumina is used in place of alumina, then the quantity of this silicate should be increased and the quartz-sand diminished, so as to keep the relative proportions of alumina and silica as above stated. After thorough fusion the mass is cooled, broken up, and ground to fine powder. After the foregoing ingredients are mixed and ground together one pound of anhydrous antimonic oxid ($Sb_2O_5$) is ground fine with ten ounces of water and then added with most thorough stirring or mixing to the first mixture above described, and the cement will be all the better if the whole compound is ground through a paint-mill set for fine grinding. The result will be a thick smooth pasty liquid having a slightly grayish-white color, and will then be ready for use for cementing sand, gravel, or other substances onto the backs of glass or other tiles or for cementing sand, gravel, or crushed stone onto the faces of bricks or for putting a smooth, white, hard finish on the faces of the same. When desired, colors or tints may be added to the cement before it is ground through the paint-mill, so as to give the faces of the brick any tint wanted, and where transparent glass is used for tiles the color of the cement, showing through the glass, will give the tiles any color wished for. Where an even surface is wanted on rough or badly-molded bricks, the cement is better when thickened by addition of fine sand, ground quartz, or carbonate of lime in fine powder in quantity according to the material used for thickening and the condition of the bricks used for facing.

The fused silicate of lime, alumina, and soda which enter into the composition of the cement may be varied somewhat from the proportions above given and yet make a good cement, and when a darker color is not objectionable I have obtained excellent results by substituting iron oxid for one-half or more of the lime in the compound fused. The addition of the iron oxid makes the mixture more easily fused, and also has greater effect in making the finished cement become insoluble after it is applied.

It is necessary to use the antimonic oxid or the antimonic acid in the anhydrous state, ($Sb_2O_5$,) for if the hydrated acids $HSbO_3$ or $H_4Sb_2O_7$ are used they will set the liquid cement at once, as soon as added, into a solid unworkable mass. The anhydrous antimonic oxid, however, after mixing with the other ingredients very slowly, or quickly if the cement is heated, becomes hydrated and then attacks the carbonate of lime present, producing insoluble calcium antimoniate and setting free carbon dioxid, which carbon dioxid, combining with the soda, produces insolubility in the alkaline silicate present. This action appears to take place even after the cement has dried to that degree that it is as hard as glass, for notwithstanding its hardness the cement contains from ten to fifteen per cent. of water, which appears to be chemically, though somewhat loosely, combined with the alkaline silicate.

The addition of the fused and finely-ground silicate of alumina, lime, and soda, or silicate and aluminate of lime, soda, and iron, contributes to the hardness and insolubility of the cement and also prevents blistering or frothing of the hard-dried cement when it is strongly heated and prevents efflorescence of carbonate of soda on the surface in the lapse of time. I will not undertake to say what are the chemical reasons for this action of the fused and powdered compound silicate, but a good deal of experience with the substance has clearly demonstrated its value for the purposes described.

There are some naturally-occurring compound silicates analogous to the above-described artificial compound which can be used with nearly equal effect in place of the artificial, as prehnite, epidote, ferruginous hornblende, (particularly those kinds containing alumina,) jadeite, augite, pyroxene, and those eruptive rocks rich in some of these minerals, also cinders of analogous composition produced in the manufacture of pig-iron from certain kinds of ore.

After the cement is applied and becomes dry it is exceedingly hard, but is also too easily affected by prolonged soaking in water, unless the cement-coated articles have been allowed to stand a long time before immersing in the water, in which case—*i. e.*, by long standing— chemical changes slowly change the character of the compound, which ultimately becomes totally unaffected by any amount of exposure to water. To hasten this change, which produces perfect insolubility, after the articles are coated or cemented and become hard by drying in air they are placed in an oven and slowly heated up to a temperature of 220° to 235° Fahrenheit and maintained at this heat for from one to five hours, according to the nature of the articles, bricks faced with glass requiring a much longer time than glass or porcelain tiles coated with a rough backing.

What I claim is—

The within-described composition of matter consisting of tetrasilicate of sodium, with calcium carbonate, powdered quartz, silicate and aluminate of lime, soda, and iron, and anhydrous antimonic oxid, all compounded and treated substantially as and for the purposes hereinbefore specified.

CHARLES F. LAWTON.

Witnesses:
CHARLES W. LOW,
JAMES M. HICKS.